(12) United States Patent
Jan

(10) Patent No.: US 11,700,213 B2
(45) Date of Patent: Jul. 11, 2023

(54) METHOD FOR MEASURING A TRANSMISSION DELAY WITH CONTROL OF DEGREES OF CONTENTION APPLIED TO A DATA FRAME

(71) Applicant: COMMISSARIAT A L'ENERGIE ATOMIQUE ET AUX ENERGIES ALTERNATIVES, Paris (FR)

(72) Inventor: Mathieu Jan, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/312,233

(22) PCT Filed: Nov. 27, 2019

(86) PCT No.: PCT/FR2019/052820
§ 371 (c)(1),
(2) Date: Jun. 9, 2021

(87) PCT Pub. No.: WO2020/120858
PCT Pub. Date: Jun. 18, 2020

(65) Prior Publication Data
US 2022/0029903 A1 Jan. 27, 2022

(30) Foreign Application Priority Data
Dec. 10, 2018 (FR) ...................... 18 72616

(51) Int. Cl.
*H04L 49/90* (2022.01)
*H04L 43/028* (2022.01)
(Continued)

(52) U.S. Cl.
CPC ............ *H04L 49/90* (2013.01); *H04L 43/028* (2013.01); *H04L 43/0858* (2013.01);
(Continued)

(58) Field of Classification Search
CPC ....... H04L 49/90; H04L 47/522; H04L 45/00; H04L 45/245; H04L 47/58; H04L 47/6225; H04L 47/50; H04L 49/253; H04M 11/062
See application file for complete search history.

(56) References Cited

U.S. PATENT DOCUMENTS 6,430,181 B1 * 8/2002 Tuckey ............... H04L 47/6225
370/386
7,706,387 B1 * 4/2010 Gibson .................. H04L 49/90
370/395.42
(Continued)

FOREIGN PATENT DOCUMENTS

WO WO 2005/029228 A2 3/2005

OTHER PUBLICATIONS

Liu et al. ("Buffer-Aware Analysis for Worst-Case Traversal Time of Real-Time Traffic over RRA-based NoCs", dated: IEEE, Mar. 6, 2017, pp. 567-575).*
(Continued)

*Primary Examiner* — Kyung H Shin
(74) *Attorney, Agent, or Firm* — Oblon, McClelland, Maier & Neustadt, L.L.P.

(57) ABSTRACT

The invention relates to a method for transmitting a target data frame (fA) on a path comprising at least one router (R) that has input ports (P1, P2, P3), at least one output port (PS) and an arbitration unit (UA) configured so as to select a data frame from a plurality of data frames each coming from a different input port and competing for transmission by one and the same output port. The method comprises specifying, for each of the access ports of the router, data frames (fB, fC) competing with the target data frame for transmission by a target output port of the router. An end-to-end transmission time of the target data frame on the path is then measured
(Continued)

while the arbitration unit selects the competing data frame (fB) before the target data frame (fA) for transmission by the target output port (PS).

7 Claims, 1 Drawing Sheet

(51) Int. Cl.
  *H04L 43/0852* (2022.01)
  *H04L 43/50* (2022.01)
  *H04L 47/62* (2022.01)
  *H04L 45/00* (2022.01)
(52) U.S. Cl.
  CPC .............. *H04L 43/50* (2013.01); *H04L 45/00* (2013.01); *H04L 47/6225* (2013.01)

(56) References Cited

U.S. PATENT DOCUMENTS

2004/0062198 A1* 4/2004 Pedersen ................ H04L 45/00
  370/229
2005/0086362 A1  4/2005 Rogers
2009/0207732 A1  8/2009 Rogers

OTHER PUBLICATIONS

International Search Report dated May 14, 2020 in PCT/FR2019/052820 filed on Nov. 27, 2019, 3 pages.

French Preliminary Search Report dated Sep. 24, 2019 in French Patent Application No. 18 72616 filed on Dec. 10, 2018 (with translation of category of cited documents), 2 pages.

Liu et al., "Buffer-Aware Analysis for Worst-Case Traversal Time of Real-Time Traffic over RRA-based NoCs", 2017 $25^{th}$ Euromicro International Conference on Parallel, Distributed and Network-Based Processing (PDP), IEEE, Mar. 6, 2017, pp. 567-575, XP033089765.

Soni et al., "Integrating Offset in WorstCase Delay Analysis of Switched Ethernet Network With Deficit Round Robbin", IEEE $23^{rd}$ International Conference on Emerging Technologies and Factory Automation (ETFA), IEEE, Sep. 4, 2018, vol.1, pp. 353-359, XP033426051.

* cited by examiner

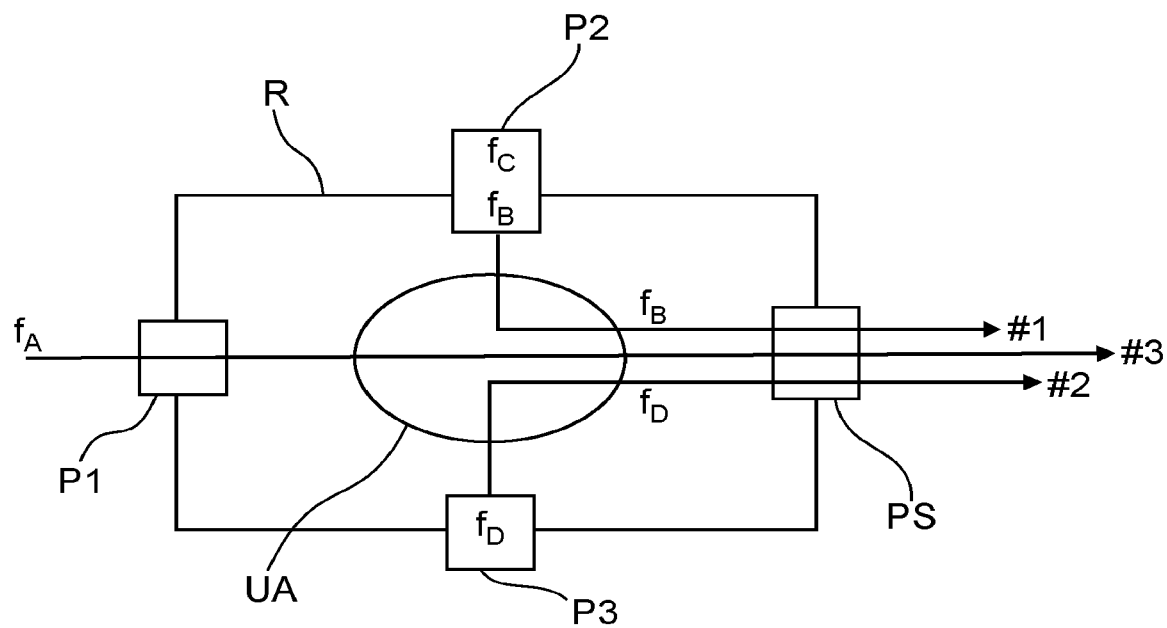

METHOD FOR MEASURING A TRANSMISSION DELAY WITH CONTROL OF DEGREES OF CONTENTION APPLIED TO A DATA FRAME

TECHNICAL FIELD

The field of the invention is that of measuring a transmission time of a data frame from a source node to a destination node of a computer network, and more particularly that of measuring a path end-to-end worst-case transmission delay (so-called WCTT delay for "Worst-Case Traversal Time").

PRIOR ART

In a distributed computing architecture, different applications exchange information across a network. A correct behaviour of these exchanges has to be guaranteed, which means that from the network point of view, when information is transmitted, it has to arrive at its destination in time. In a strict real-time context, a result that is right but out of time is an unusable result. Therefore it turns out to be necessary to provide a guarantee relating to an end-to-end transmission time, especially via an upper bound of such a transmission time called the end-to-end worst-case transmission time (WCTT). The network flows in question can be exchanged between nodes, whether they are single-processor or multi-processor nodes, interconnected by a network, for example of the Ethernet type, but also within nodes of a many-core architecture interconnected by a Network on Chip (NoC).

When several flows are likely to traverse a same network, the computation of such end-to-end delays is a complex problem because, in addition to the technological latency (depending on the equipment used) and the transmission itself (varying according to the link throughput), there is also a waiting time in the router queues which depends on the presence or absence of other flows using the same transmission medium at the output of a router (this is referred to as contention flows or even transmission competing flows).

Determining the WCTT can be performed analytically using different computational methods, such as for example grid computation, trajectory-based approach, model checking, queuing theory or recursive computation. The choice of one method over another mainly depends on whether worst-case transmission times are required or not and whether the computational method can be correctly applied to the network under consideration. However, it is possible to apply a computational method even when not all its application conditions are satisfied by means of appropriate abstractions, but at the cost of generating over-approximations in the computed end-to-end delay values. Furthermore, the complexity of the computational method is an important evaluation criterion to ensure its practical application on concrete cases. A conventional technique to reduce this complexity is to abstract the network operation but always at the cost of generating over-approximations on the values computed.

An alternative to these analytical methods consists in observing the flow end-to-end transmission times, by simulation or directly on the real system. However, this approach does not make it possible to guarantee obtaining a worst case value because of the difficulty of demonstrating that all possibilities have been covered or simply guarantee that the system configuration does indeed generate such a worst case in practice.

DISCLOSURE OF THE INVENTION

One purpose of the invention is to provide a technique for measuring an end-to-end transmission time that can offer the assurance of observing conditions for obtaining a worst-case transmission and that allows an exact worst-case value to be determined. To this end, the invention provides a method for transmitting data frames each on a path comprising at least one router which includes input ports, at least one output port and an arbitration unit configured to select a data frame from a plurality of data frames each coming from an input port and competing for transmission through a same output port. The method comprises, for each router in the path of a target data frame, specifying, for each of the input ports of the router, data frames competing with the target data frame for transmission through a target output port of the router. The method comprises transmitting the target data frame and the competing data frames and measuring an end-to-end transmission time of the target data frame on the path. Transmitting the target data frame comprises for each router in the path:

in the presence of the target data frame on an input port of the router, selecting, by the arbitration unit, one or more competing data frames; and transmitting the one or more selected competing data frames through the target output port prior to transmitting the target data frame.

Some preferred but not limiting aspects of the method are as follows:

the specifying step is performed so as to result in the transmission of the target data frame according to an end-to-end worst case transmission delay;

the arbitration unit is configured to implement a round-robin arbitration policy and a competing data frame selected is a competing data frame associated with an access port that follows the access port associated with the target data frame in the round-robin;

the arbitration unit is configured to implement an absolute priority type arbitration policy and the one or more selected competing data frames are competing data frames having a priority level higher than a priority level of the target data frame;

the competing data frames carry a dummy payload;

the presence of the target data frame on an access port of the router is identified by recognising a reference header of the target data frame in a data frame reference header table associated with said access port;

the target data frame includes a field indicative of a competitive process;

each input port has associated with it a sequence of description of the specified data frames competing with the target data frame for transmission through the target output port of the router;

the competing data frames are designated as target data frames which are also placed in contention on each of the routers in their paths via a competing data frame specification, in a similar way to what is performed with the target data frame.

BRIEF DESCRIPTION OF THE DRAWINGS

Further aspects, purposes, advantages and characteristics of the invention will be more apparent upon reading from the following detailed description of preferred embodiments thereof, given by way of non-limiting example, and made with reference to the appended drawing in which:

FIG. 1 illustrates an example of implementation of the method according to the invention with a round-robin type arbitration policy.

DETAILED DESCRIPTION

The invention relates to a method for transmitting a data frame on a path linking a source node to a destination node. During its transmission on its path, this frame may be in contention with other frames, i.e. blocked by these frames. Two frames are said to be in direct contention when the intersection of their paths is non-empty. When the intersection of their paths is empty, two frames can be in a situation of indirect contention via a third frame. To do so, this third frame has a non-empty path intersection with each of the other two frames.

In general, the invention provides measuring the end-to-end transmission time of a target frame from its source node to its destination node while the degree of contention experienced by the target frame at each progression towards the destination node, that is at each router encountered on its path, is controlled. The invention more particularly provides influencing the arbitration policy implemented on each of the routers encountered by the target frame by indicating frames that should systematically be transmitted before the target frame and thus generating direct and indirect contention on the target frame during the measurement in a controlled manner. In this way, it is possible to obtain end-to-end transmission time envelopes for the target frame. If the degree of contention experienced by the target frame is maximum, then the end-to-end transmission time obtained is a worst case value.

The arbitration execution mode implemented by the routers in accordance with the invention is only accessible in a specific distributed system configuration and protected from any unauthorised use. To do so, this execution mode may simply be present only during the design phase of the system or secured by adequate authentication methods if this execution mode is possible during the execution of application software. Finally, this execution mode can be present in a distributed system but also in a simulation environment of the same distributed system.

The following disclosure focuses on a single router, but it is clear that the arbitration execution mode provided by the invention is intended to be implemented by each of the routers on the path of the target frame.

The router comprises input ports, at least one output port and an arbitration unit configured to select a data frame from a plurality of data frames each coming from an input port and competing for transmission through a single output port. The role of the arbitration unit is thus to select among competing frames the one that will be able to access and use the output port to progress in its transmission.

The arbitration strategy implemented by the arbitration unit is, for example, of the round-robin type and then consists in managing the input ports in a circular queue. Alternatively, it can be of the absolute priority type (a priority is then associated with each frame), of the First-In First-Out (FIFO) type, etc. The following disclosure refers to the round-robin or absolute priority type strategies only as examples of possible strategies, without being limitative of the invention.

The method according to the invention comprises, for each router in the path of the target frame, a step of specifying, for each of the access ports of the router, data frames competing with the target data frame for transmission through a target output port of the router. These competing data frames are thus artificially placed in contention with the target frame and have to be systematically transmitted before the target frame each time the target frame is to be processed by the arbitration policy of the router and according to its arbitration strategy. The degree of contention experienced by the target frame is thereby controlled while remaining compatible with the arbitration policy.

For example, if the strategy is of the round-robin type and the router has n input ports, a target frame can be placed in contention with up to n−1 frames competing for transmission, each coming from a different input port and different from the input port of the target frame. If the strategy is of the absolute priority type and the router has n input ports, a target frame may be placed in contention with p competing frames of priority higher than or equal to the priority of the target frame, potentially from the same input port of the router (potentially including the port of the target frame).

The specification of the competing data frames is deduced from an analysis of all the network flows of the applications present in the distributed system under consideration passing through this router. For a distributed system, it is more particularly hypothesised that it is possible to statically determine (upon designing the system) the paths and sizes of frames exchanged between the different applications present. The path of a frame is described as a succession of routers used by the frame to reach its destination node from its source node. This hypothesis of a static description of all the frames is for example a necessity in the field of real-time systems with strict temporal deadlines.

From this static description of the paths of all frames, it is possible to indicate to each router of the distributed system which frames should be present on each of its input ports for artificial contention in a direct way with the target frame $f_A$. To do so, a frame competing with the target frame is described by the header information required for its transmission, a dummy unit application load, typically a word, and the number of times this application load has to be reproduced to achieve the size of the frame which thus carries a dummy payload.

In the same way, for each frame $f_B$ competing with the target frame $f_A$, it is necessary to indicate to each router in the distributed system the frames that should artificially be present on each of its input ports for contention in a direct way with frame $f_B$ and recursively for all frames added in this way. In other words, the $f_B$ frame itself becomes a target frame for which competing frames are specified. This recursive configuration approach makes it possible to take indirect contention phenomena into account.

Thus, the method may also comprise designating each data frame competing with the target frame as a target competing data frame, and for each target competing data frame, for each router in the path of the target competing data frame, specifying, for each input port of the router, data frames competing with the target competing data frame for transmission through a target output port of the router.

It is up to the user to specify all contention frames that define the degree of contention that the target frame $f_A$ will experience. Thus, if the specification of the frames in contention is exhaustive, the degree of contention that the target frame $f_A$ will experience is maximum and the measured end-to-end delay will correspond to a worst case end-to-end delay. Nevertheless, the user can deliberately specify a partial list of frames in contention in order to measure end-to-end delays with a lower degree of contention and thus obtain end-to-end delay envelopes by applying different degrees of contention. Finally, it should be noted that the invention does not relate to the production of the frames in contention, and that a person skilled in the art can easily develop a tool for automating the construction of these frames.

In one possible embodiment, at the end of the specification step, a flow_in_contention data structure is associated with each input port of the router and makes it possible to associate with each target frame a sequence of description of frames in competitive process with the target frame. Such a sequence of description of frames is sorted to represent the order of contention of the frames of this sequence on the target frame. An index may be associated with each sequence of description of frames competing with a target frame in order to point to the next frame competing with the frame and to be able to determine the end of that sequence (either implicitly with an identifiable element at the end of the sequence or explicitly by adding a field representing the size of the sequence). The storage of sequences of competing frames is necessary because the worst case situation for a target frame can indeed require several unfavourable, i.e. not won by the target frame, arbitration decisions per target frame before selecting the target frame.

The target data frame comprises a field indicative of a competitive process. For example, each frame header of a flow is modified to include a bit indicating whether this frame should be placed in contention (noted as contention_bit). The setting of this bit depends on the protocols used in information transmission between two nodes in a distributed system. For example, if the network under consideration is a NoC then the first FLow control unIT (FLIT) of each frame includes such a bit. If the network under consideration is Ethernet based, the EtherType field of the Ethernet header can be used to contain this information.

Each input port of the router is associated with a table called flow_reference which allows the corresponding flow to be identified from a reference header. Each frame with the contention_bit set to 1 has its header searched in this table to identify the received flow. Thus, the presence of the target data frame on an access port of the router is identified by recognising a reference header of the target data frame in a data frame reference header table associated with said access port.

The steps of the method according to the invention may be as follows for processing each incoming frame on an input port $P_A$ of a router.

1) If the contention_bit field of the header of the incoming frame is set to 1, this header is compared to the reference headers stored in the flow_reference table by this port to identify the frame received. If no frame is identified, an error is reported via an appropriate error register and the method waits for the reception of an incoming frame before restarting at step 1.

2) If a frame is identified, the identifier of this frame $f_X$ is transmitted to all other input ports to determine whether flows from these other input ports should be artificially in competitive process with the flow $f_X$. To do so, the identifier $f_X$ is used by each input port as a key in the flow_in_contention data structure to identify the next flow to be transmitted by each input port of the router.

3) The arbitration policy implemented by the arbitration unit is overloaded to implement the worst case arbitration situation for the frame $f_X$. This overload consists in determining an input port and the frame that should be transmitted from this input port. For example, the worst case situation for a round-robin type arbitration policy is to consider that the next input port likely to transmit a frame is the input port $P_B$ located just after the input port $P_A$ with which the frame $f_X$ is associated according to the order of traversal of the input ports used by the arbitration policy of the router. The worst case situation for an absolute priority arbitration policy is to systematically choose an input port with a frame waiting for a priority higher than or equal to than the priority of the frame $f_X$.

A round-robin type arbitration policy requires storing the access port selected to transmit the frame competing with the frame $f_X$ in order to be able to start again from this access port in choosing the next input port to be selected. By contrast, an absolute priority arbitration policy does not require such a storage because any input port having a priority frame higher or equal to that of the $f_X$ frame is a valid decision for the method.

4) If a data frame $f_Y$ competing with the target data frame exists for the input port $P_B$, then it is transmitted. The flow_in_contention data structure of $P_B$ is then updated so that the sequence index associated with $f_X$ points to the next frame in competitive process if several arbitration decisions are required to represent the desired degree of contention.

5) Steps 3 and 4 are repeated until the arbitration policy cannot determine any more frames $f_Y$ with a priority higher than or equal to the frame $f_X$ in the case of an absolute priority arbitration policy, or chooses the port $P_A$ in the case of a round-robin type arbitration policy.

6) The frame $f_X$ can then be transmitted and, on each input port, the sequence of description of frames in competitive process with the frame $f_X$ has its index repositioned to the head of this sequence to be taken into account during a next instance of the frame $f_X$.

Thus, the method according to the invention comprises, subsequently to the specification step, transmitting the target data frame and the competing data frames and measuring an end-to-end transmission time of the target data frame on its path. The transmission of the target data frame comprises at each router in its path:
    in the presence of the target data frame on an access port of the router, selecting, by the arbitration unit, one or more competing data frames; and
    transmitting through the target output port the competing data frame(s) selected prior to transmitting the target data frame.

The measurement of the end-to-end transmission time of the target frame between a date of emission by the source node and a date of reception by the destination node is achieved by any technique known to those skilled in the art and is not further described here. Hardware timestamping can especially be implemented for this purpose, using for example the IEEE 1588 clock synchronisation protocol.

When the arbitration unit is configured to perform a round-robin type arbitration, a competing data frame selected is a competing data frame associated with an access port that follows the access port associated with the target data frame in the round-robin.

And when the arbitration unit is configured to perform an absolute priority round-robin arbitration, the competing data frame(s) selected are competing data frames having a priority level higher than a priority level of the target data frame.

Furthermore, when indirect contention phenomena are taken into account, transmitting each target competing data frame comprises at each router on its path:

i) in the presence of the target contention data frame on an input port of the router, selecting one or more data frames competing with the target contention data frame; and ii) transmitting through the target output port the competing data frame(s) selected prior to transmitting the target competing data frame.

An example of implementation of the method according to the invention is described in the following at a router R comprising three input ports P1, P2 and P3 and one output port PS. The target frame is the incoming frame $f_A$ on port P1. Subsequently to the specification step, frames $f_B$ and $f_C$ are artificially in competitive process with the target frame $f_A$ on port P2, and frame $f_D$ is artificially in competitive process with target frame $f_A$ on port P3.

The target frame $f_A$ contains a header in which the contention bit bit is set to 1 triggering step 1 above. The flows $f_B$, $f_C$ and $f_D$ are then identified as having to be placed in contention with $f_A$, respectively on ports P2 (for $f_B$ and $f_C$) and P3 (for $f_D$).

The arbitration policy implemented by the arbitration unit is of the round-robin type. The input ports of the router are numbered according to the order of traversal by the arbitration policy, i.e. an index points to the current input port which is simply incremented at each arbitration decision to avoid an input port monopolising an output port.

In step 3 of the method, this index is set on the input port P2, corresponding to the worst case for this arbitration policy. A first arbitration decision is made and the frame $f_B$ is transmitted on the output port PS (#1 in FIG. 1). The sequence in contention from the input port P2 for the target frame $f_A$ is updated to point to the next flow to be placed in contention on the input port P2, in this case frame $f_C$. The index of the arbitration unit is then set to the next input port, in this case port P3. A new arbitration decision is then made resulting in the transmission of frame $f_D$ (steps 3 and 4; #2 in FIG. 1). The index of the arbitration unit is then set to the next input port, in this case port P1. A final arbitration decision is then made, this time resulting in the transmission of the target frame $f_A$ (method step 6; #3 in FIG. 1). The next time the frame $f_A$ is placed into contention, when the index is set on the input port P2, the arbitration decision will result in the transmission of the frame $f_C$.

The difference when the arbitration policy has absolute priority is now illustrated, hypothesising that frame $f_B$ has a higher priority than frame $f_C$, which in turn has a higher priority than frame $f_D$, which in turn has a higher priority than frame $f_A$. The difference lies in the fact that the first two arbitration decisions result in the successive transmission of frames $f_B$ and $f_C$ even though they come from the same input port P2. Then, the third arbitration decision results in the transmission of frame $f_D$ and the fourth arbitration decision results in the transmission of frame $f_A$.

The invention claimed is:

1. A method for transmitting data frames each on a path comprising at least one router which includes input ports, at least one output port and an arbitration unit configured to select a data frame from a plurality of data frames each coming from an input port and competing for transmission through a same output port, the method comprising the following steps of:
    a) for each router in the path of a target data frame, the target data frame including a field indicative of a competitive process, and in response to the field being indicative of the competitive process, providing, for each of the input ports of the router that are separate from an input port at which the target data frame is received, artificial competing data frames that have a dummy payload to be in contention with the target data frame for transmission through a target output port of the router;
    b) transmitting the target data frame and the competing data frames and measuring an end-to-end transmission time of the target data frame on the path, transmitting the target data frame comprising for each router in the path:
        i) in the presence of the target data frame on a router input port, selecting, by the arbitration unit, one or more competing data frames; and
        ii) transmitting through the target output port the one or more competing data frames selected prior to transmitting the target data frame.

2. The method according to claim 1, wherein the providing step is performed so as to result in the transmission of the target data frame according to an end-to-end worst case transmission delay.

3. The method according to claim 1, wherein the arbitration unit is configured to implement a round-robin type arbitration policy and wherein a competing data frame selected is a competing data frame associated with an access port that follows the access port associated with the target data frame in the round-robin.

4. The method according to claim 1, wherein the arbitration unit is configured to implement an absolute priority type arbitration policy and wherein the selected competing data frame(s) are competing data frames having a priority level higher than a priority level of the target data frame.

5. The method according to claim 1, wherein the presence of the target data frame on an access port of the router is identified by recognising a reference header of the target data frame in a data frame reference header table associated with said access port.

6. The method according to claim 1, wherein each input port has associated with it a sequence of description of the specified data frames competing with the target data frame for transmission through the target output port of the router.

7. The method according to claim 1, wherein the competing data frames are each transmitted on a path comprising at least one router, comprising:
    a) designating each competing data frame as a target competing data frame;
    b) for each target competing data frame, for each router in the path of the target competing data frame, specifying, for each input port of the router, data frames competing with the target competing data frame for transmission through a target output port of the router; and
    c) wherein transmitting each target competing data frame comprises at each router on its path:
        i) in the presence of the target competing data frame on an input port of the router, selecting one or more data frames competing with the target competing data frame present on said input port; and
        ii) transmitting, through the target output port, the one or more competing data frames selected before the target competing data frame.

* * * * *